United States Patent [19]
Topol et al.

[11] 3,821,090
[45] June 28, 1974

[54] METHOD FOR DIRECTLY MEASURING NO$_2$ IN AIR

[75] Inventors: Leo E. Topol, Canoga Park; Douglas O. Raleigh, Encino, both of Calif.

[73] Assignee: Rockwell International Corporation, El Segundo, Calif.

[22] Filed: June 14, 1973

[21] Appl. No.: 370,118

[52] U.S. Cl. ............................. 204/1 T, 204/195 S
[51] Int. Cl. ........................................... G01n 27/46
[58] Field of Search ......... 204/1 T, 195 S; 136/86 F

[56] References Cited
UNITED STATES PATENTS

| | | | |
|---|---|---|---|
| 3,691,023 | 9/1972 | Ruka et al. | 204/1 T |
| 3,698,955 | 10/1972 | Lilly et al. | 204/195 S |
| 3,719,564 | 3/1973 | Lilly et al. | 204/1 T |
| 3,764,269 | 10/1973 | Oldham et al. | 23/254 E |

Primary Examiner—T. Tung
Attorney, Agent, or Firm—L. Lee Humphries; Robert M. Sperry

[57] ABSTRACT

A method of directly measuring concentration of NO$_2$ in air at the parts-per-million level, said method comprising the steps of forming a solid sensor cell having a silver cathode, a silver iodide electrolyte, and a platinum anode; applying a biasing voltage of 0.05 to 0.25 volt across said sensor cell, passing air to be sensed across the anode of said cell, and measuring the electrical current through said cell.

6 Claims, 1 Drawing Figure

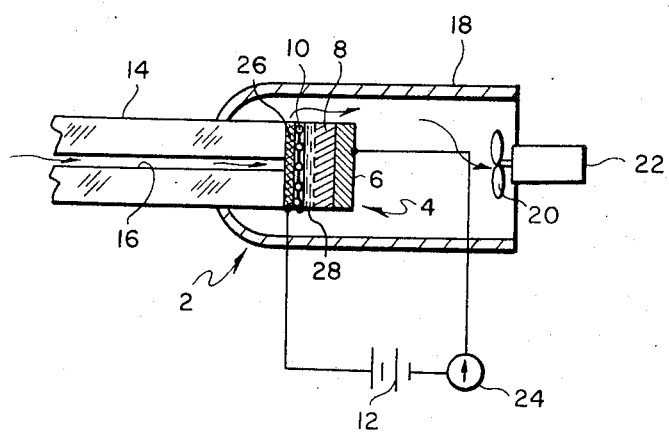

3,821,090

METHOD FOR DIRECTLY MEASURING $NO_2$ IN AIR

BACKGROUND OF THE INVENTION

1. Field of the Invention

This invention relates to pollutant detection and is particularly directed to a method for directly detecting $NO_2$ in air.

2. Prior Art

In recent years, recognition of environmental limitations has led to widespread qualitative and quantitative studies and analyses of atmospheric pollutants, such as nitrogen dioxide. Numerous devices and techniques have been proposed over the years for detecting such pollutants. However, most of the prior art techniques and devices have sought to simply detect or make relatively gross measurements of the pollutants. Other prior art devices and techniques have permitted more refined quantitative measurements, but have required extensive time, skilled technicians, and equipment which was often elaborate, delicate, expensive and required considerable readjustment and maintenance.

More recently, it has been discovered that many of the common pollutants may be selectively measured by making use of specific solid-state chemical compounds which liberate halogens when exposed to such pollutants. Several compounds for accomplishing this are disclosed in the copending application of Leo O. Topol, Ser. No. 307,325, filed Nov. 16, 1972, entitled, "Solid Iodogenic Agent for Oxides of Nitrogen," and assigned to the present assignee. These compounds permit measurement of pollutants at the parts-per-million level when employed in solid state halogen sensors, such as those disclosed in U.S. patent application Ser. No. 213,038, filed Dec. 28, 1971, by Keith B. Oldham and Leo E. Topol, entitled, "Sensor for Fluid Components," now U.S. Pat. No. 3,764,269 and in U.S. patent application Ser. No. 309,574, filed Nov. 24, 1972, by Douglas O. Raleigh, entitled, "Solid Electrolyte Devices for Measuring Halogen Gas Concentration," both of said applications being assigned to the present assignee. While these devices have significantly advanced the state of the art, it will be seen that these devices provide only indirect measurements of the pollutants. Thus, none of the prior art methods or apparatus has been entirely satisfactory.

BRIEF SUMMARY AND OBJECTS OF INVENTION

These disadvantages of the prior art are overcome with the present invention and a method and apparatus are disclosed for directly measuring air pollutants at the parts-per-million level.

The advantages of the present invention are preferably attained by forming a solid sensor cell having a silver cathode, a silver iodide electrolyte, and a platinum anode; applying a biasing voltage of 0.05 to 0.25 volt across said sensor cell; passing air to be sensed across the anode of said sensor cell; and measuring the electrical current through said cell. As used in this applications, the terms "anode" and "cathode" refer to the polarity of the applied voltage, rather than to their electrochemical meaning which, in the present case, would be the reverse.

Accordingly, it is an object of the present invention to provide a method and apparatus for directly measuring air pollutants at the parts-per-million level.

A specific object of the present invention is to provide a method of directly measuring concentrations of $NO_2$ in air at the parts-per-million level, said method comprising the steps of forming a solid sensor cell having a silver cathode, a silver iodide electrolyte, and a platinum anode, applying a biasing voltage of about 0.25 volt across said sensor cell; passing air to be sensed across the anode of said sensor cell; and measuring the electrical current through said sensor cell.

These and other objects and features of the present invention will be apparent from the following detailed description, taken with reference to the accompanying drawing:

BRIEF DESCRIPTION OF DRAWING

The FIGURE is diagrammatic representation of a sensor cell embodying the present invention.

DETAILED DESCRIPTION OF THE INVENTION

In that form of the present invention chosen for purposes of illustration, the FIGURE shows a sensing device, indicated generally at 2, having a solid electrochemical sensor cell 4. The cell 4 comprises a powdered metallic silver cathode 6 and a solid electrolyte 8 formed of a material, such as silver iodide or silver bromide, which is capable of appreciable silver ion conduction at room temperature, to which is applied an optional compacted platinum dust-silver iodide layer 28 and a porous anode 10 of a material such as graphite or an inert metal. A specific embodiment of the anode is a mesh of platinum wire partially embedded in the adjacent surface of the solid electrolyte 8. Electrical contact to anode 10 is made by porous leadwire mesh 26. A voltage source, such as battery 12, is connected across the cell 4 and applies a bias voltage of 0.05 to 0.25 volt, silver side negative, across the cell 4. The sensor cell 4 is mounted on one end of an inlet conduit 14 having an axial duct 16 through which air to be sensed is delivered to the anode 10 of the sensor cell 4. An outlet conduit 18 is connected to the inlet conduit 14 and extends about the sensor cell 4 to carry off air which has been sensed. Suitable means, such as fan 20, driven by motor 22, may be provided to drive air through the device 2. Finally, a current meter 24 is connected in series with the sensor cell 4 and battery 12 to measure the electrical current through the cell 4.

Structurally, the sensing device 2 is identical with the device disclosed by Douglas O. Raleigh, in copending application Ser. No. 309,574, filed Nov. 24, 1972, and assigned to the present assignee, for detecting halogen concentrations as an indirect indication of pollutants. For that purpose, biasing voltages of 0.4 to 0.5 volt were employed. However, in accordance with the present invention, it has been found that, by employing a biasing voltage of only 0.05 to 0.25 volt, the device 2 is capable of directly sensing $NO_2$ at the parts-per-million level. If, in this voltage range, the cell is exposed to air containing $NO_2$, a cell response current of about 4 to 60 nA/ppm $NO_2$, depending on bias voltage, is observed. The response is linear in the $NO_2$ concentration and response times are at least as short as several minutes. Background currents range from 10 – 80 nA, depending on bias voltage. Low bias voltage increases sensitivity and reduces background current, but cell current noise is greater, response to concentration changes slower, and sensitivity to humidity level greater. Thus, a range of choice of bias voltage is available, depending on the relative importance of these various parameters in a given application.

High humidity (greater than 50%) slows down response to $NO_2$ concentration changes, but does not influence response current sensitivity (nA/ppm). The humidity level can, in practice, be kept below 50% by drawing a fraction (such as one-half) of the inlet gas stream through an efficient drying and adosrbing column, such as silica gel. The latter would remove both $NO_2$ and $H_2O$, thus having the effect of diluting the input sample gas with a known proportion of clean dry air.

Two advantages of particular interest for this type of solid state detector are constancy of response current sensitivity (nA/ppm) and independence of input gas flow rate. Previous solid state amperometric detection devices (patent applications filed by L. Topol, Topol and Oldham, D. O. Raleigh) have shown some sensitivity reduction with time when currents are larger than 100 nA and are sensitive to gas flow rate. By contrast, the present cell concept showed an overnight current response of 685 ± 0.7 percent nA to 19 ppm $NO_2$ and has shown stable response currents up to at least several days. The reason for the response constancy and flow rate intensitivity is that the electrochemical reaction rate of the $NO_2$ at the sensing electrode appears to be determined by electron transfer kinetics rather than mass transport. Thus, while sensitivity in other gas detection devices may be influenced by the rate of arrival of the reactant gas at the electrode and the buildup of a reaction product layer, this is not the case for the present device. Therefore, frequent recalibration and close control of inlet gas flow are not necessary.

For optimum response, the detector cell is best operated at 70° – 110° C. At higher temperatures, background currents and noise become too high, while at lower temperatures, response times appear slowed down and sensitivity does show notable downdrift with time.

Obviously, numerous variations and modifications may be made without departing from the present invention. Accordingly, it should be clearly understood that the form of the present invention described above and shown in the accompanying drawing is illustrative only and is not intended to limit the scope of the present invention.

What is claimed is:

1. The method of directly sensing $NO_2$ in air, said method comprising the steps of:

passing air to be sensed across the anode of an electrochemical polarization cell having a metallic silver cathode, a solid electrolyte capable of appreciable silver ion conduction at room temperature, and a porous anode composed of a material selected from the group consisting of graphite and an inert metals;

applying a biasing voltage of about 0.25 volt across said cell; and measuring the current through said cell as an indication of the concentration of $NO_2$ at the parts-per-million level.

2. The method of claim 1 wherein:
said metallic silver cathode is formed of compacted powdered silver.

3. The method of claim 1 wherein:
said solid electrolyte is a silver halide.

4. The method of claim 1 wherein:
said solid electrolyte is silver iodide.

5. The method of claim 1 wherein:
said porous anode is formed of platinum.

6. The method of claim 1 wherein:
said porous anode is formed of wire mesh.

* * * * *